United States Patent
Suzuki

(10) Patent No.: US 10,635,037 B2
(45) Date of Patent: Apr. 28, 2020

(54) IMAGE FORMING APPARATUS THAT CAN BE USED IN COMBINATION WITH MOBILE TERMINALS, AND IMAGE FORMING SYSTEM IN WHICH THIS IMAGE FORMING APPARATUS AND MOBILE TERMINALS ARE USED IN COMBINATION

(71) Applicant: KYOCERA Document Solutions Inc., Osaka (JP)

(72) Inventor: Atsushi Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/355,466

(22) Filed: Mar. 15, 2019

(65) Prior Publication Data

US 2019/0286032 A1   Sep. 19, 2019

(30) Foreign Application Priority Data

Mar. 15, 2018   (JP) .................................. 2018-047792

(51) Int. Cl.
G03G 15/00   (2006.01)
G06F 3/041   (2006.01)

(52) U.S. Cl.
CPC ..... *G03G 15/5016* (2013.01); *G03G 15/5075* (2013.01); *G06F 3/0412* (2013.01); *G06F 3/0416* (2013.01); *G03G 2215/00109* (2013.01)

(58) Field of Classification Search
CPC ........... G03G 15/5016; G03G 15/5075; G03G 2215/00109; G06F 3/0412; G06F 3/0416
See application file for complete search history.

(56) References Cited

U.S. PATENT DOCUMENTS

| 2005/0067198 | A1* | 3/2005 | LeBlanc | G08B 3/10 178/3 |
| 2011/0131593 | A1* | 6/2011 | Scott | H04N 21/252 725/9 |
| 2013/0057913 | A1* | 3/2013 | Park | G06F 21/608 358/1.15 |
| 2016/0065661 | A1* | 3/2016 | Kang | H04L 67/104 709/203 |

FOREIGN PATENT DOCUMENTS

JP   2014-035723 A   2/2014

* cited by examiner

*Primary Examiner* — Gregory H Curran
(74) *Attorney, Agent, or Firm* — Hawaii Patent Services; Nathaniel K. Fedde; Kenton N. Fedde

(57) ABSTRACT

Provided is an image forming apparatus that when a mobile terminal and image forming apparatus are used in combination, causes an operation to be performed by operating only one side. The image forming apparatus is used by being connected to a mobile terminal provided with a terminal side touch panel display. The communicating unit communicates with the mobile terminal and exchanges data. The apparatus side touch panel display is used for self operation of the image forming apparatus. The control unit, via the communicating unit, receives terminal side image data as content that is displayed on the terminal side touch panel display of the mobile terminal from the mobile terminal side, transmits apparatus side operation data corresponding to the content operated by a user on the apparatus side touch panel display to the mobile terminal side, and causes an application in the mobile terminal to be executed using the apparatus side operation data.

4 Claims, 16 Drawing Sheets

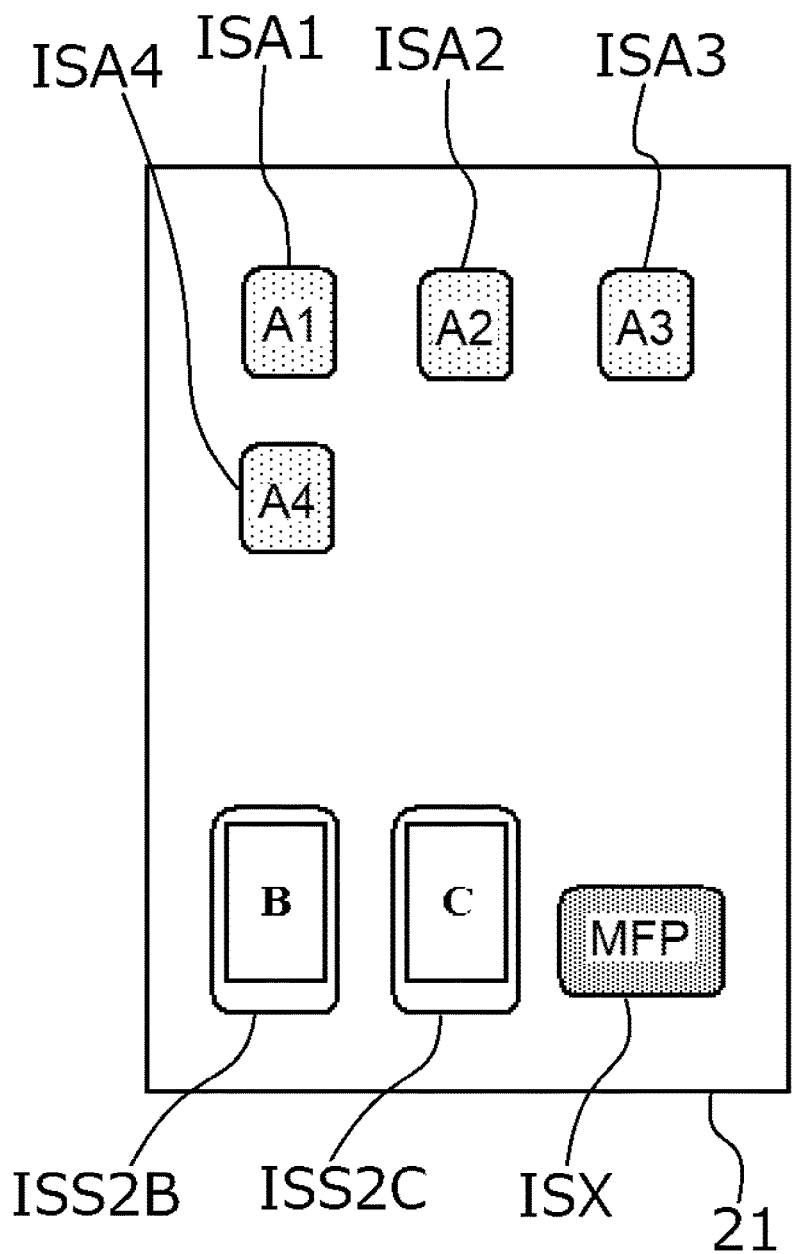

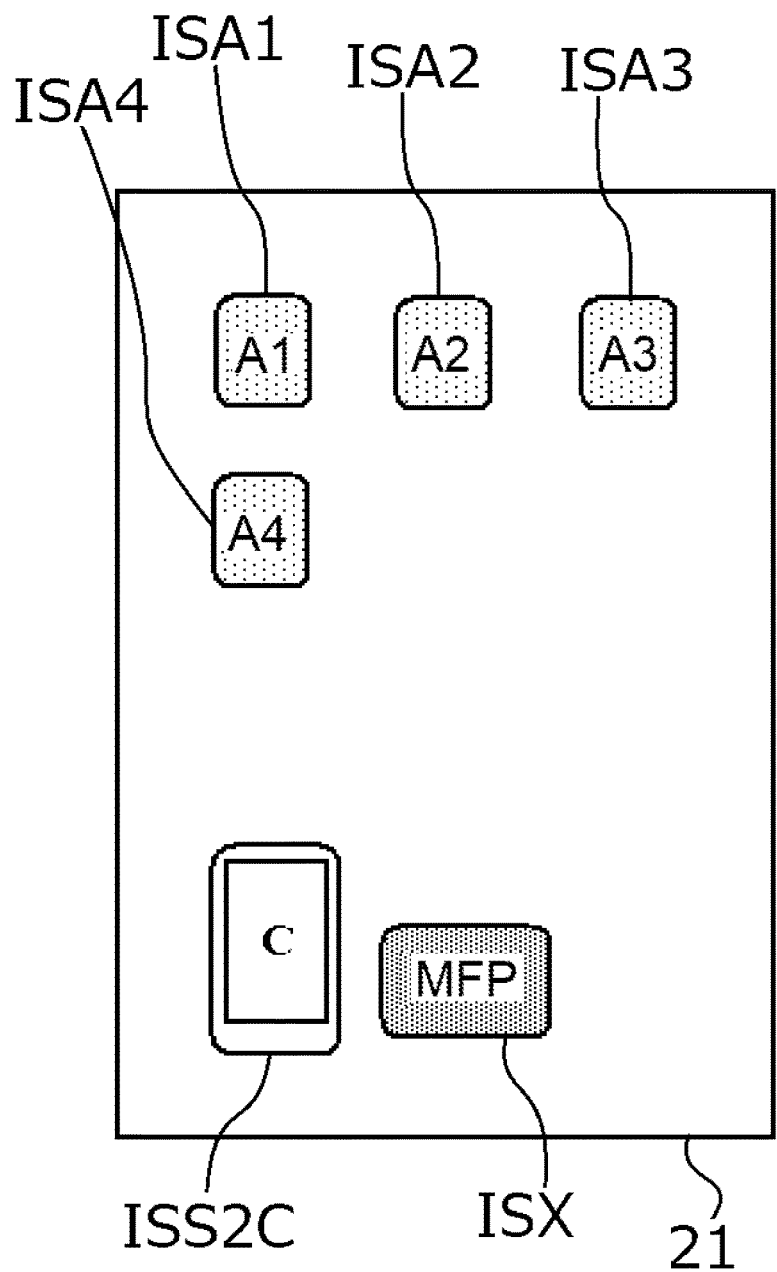

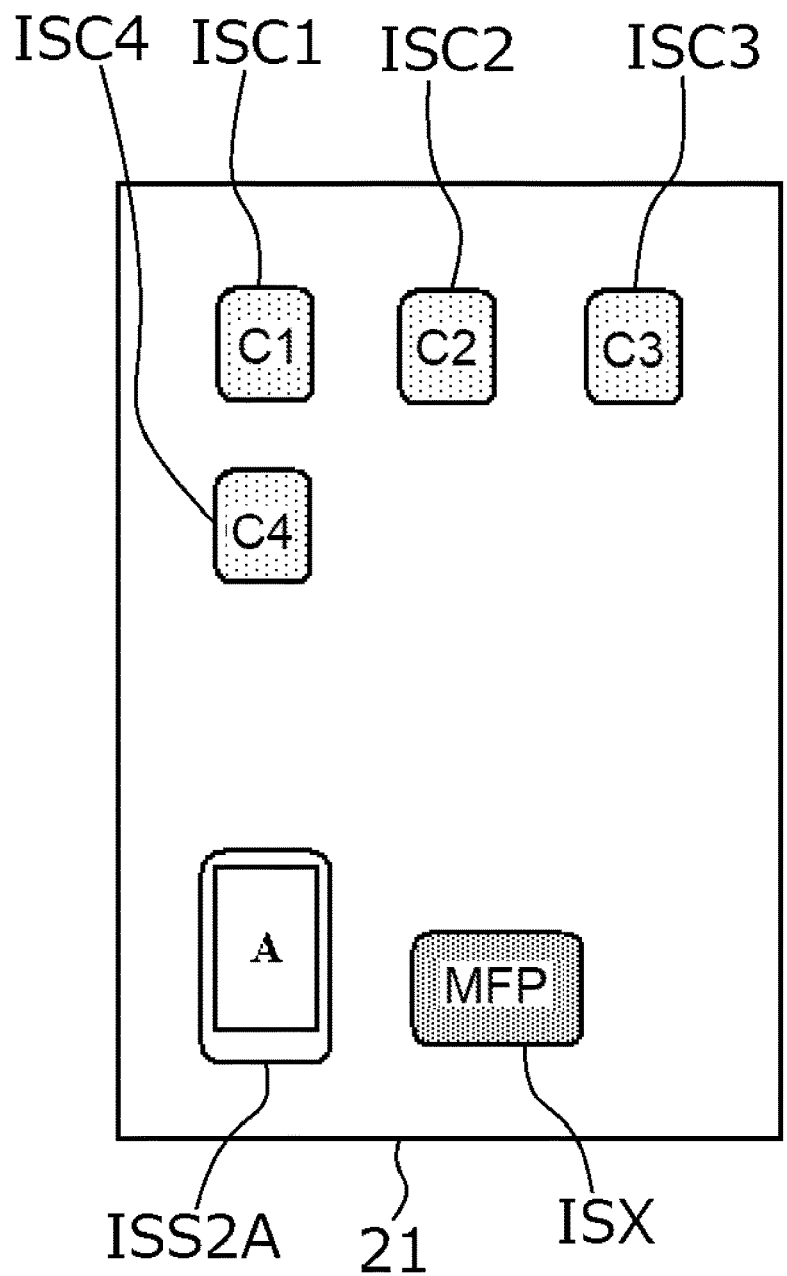

IMAGE FORMING APPARATUS THAT CAN BE USED IN COMBINATION WITH MOBILE TERMINALS, AND IMAGE FORMING SYSTEM IN WHICH THIS IMAGE FORMING APPARATUS AND MOBILE TERMINALS ARE USED IN COMBINATION

INCORPORATION BY REFERENCE

This application is based on and claims the benefit of priority from Japanese Patent Application No. 2018-047792 filed on Mar. 15, 2018, the contents of which are hereby incorporated by reference.

BACKGROUND

The present disclosure relates to an image forming apparatus that can be used in combination with mobile terminals. The present disclosure also relates to an image forming system in which the image forming apparatus and the mobile terminals are used in combination.

As an image forming apparatus that forms and outputs an image on a medium (paper), a multifunction printer (MFP) capable of performing communication via a network can perform various operations in particular. On the other hand, a mobile terminal such as a smartphone or the like can also perform various operations via a network, however, since the mobile terminal is small in size, it is impossible for the mobile terminal to perform an operation for forming and outputting an image on a medium, for example. Therefore, an MFP that can be used in combination with a mobile terminal is used.

For example, as a typical technique, there is a technique in which a MFP transmits an operation screen for operating the MFP and a command table corresponding to the operation screen to a mobile terminal via a network, and the mobile terminal displays the operation screen itself. In this case, on the operation screen, a plurality of icons are used so as to simplify operation on the mobile terminal. Therefore, on this operation screen, the user can perform operations on this operation screen by performing operations (dragging and the like) on icons similar to those when executing a normal application on the mobile terminal.

After that, the mobile terminal recognizes the operation on this operation screen and regards the operation as input of a command corresponding to the corresponding operation, then transmits a notification indicating that to the MFP side. As a result, it is possible to operate the MFP from the mobile terminal side, and for example, it is possible to output an image stored on the mobile terminal side from the MFP without touching the MFP. In the typical technique described above, it is possible to efficiently display the data of the operation screen including a large number of icons as described above on the mobile terminal side, and to smoothly perform the above-described operation.

SUMMARY

The image forming apparatus according to the present disclosure is an image forming apparatus that is used by being connected to a mobile terminal provided with a terminal side touch panel display. The image forming apparatus includes a communicating unit, and apparatus side touch panel display, and a control unit. The communicating unit communicates with the mobile terminal and exchanges data. The apparatus side touch panel display is used for self operation of the image forming apparatus. The control unit, via the communicating unit, receives terminal side image data as content that is displayed on the terminal side touch panel display of the mobile terminal from the mobile terminal side, transmits apparatus side operation data corresponding to the content operated by a user on the apparatus side touch panel display to the mobile terminal side, and causes an application in the mobile terminal to be executed using the apparatus side operation data.

BRIEF DESCRIPTION OF THE DRAWINGS

FIG. 6A is an example (first example) of an image displayed on the touch panel display of each mobile terminal when three mobile terminals are connected to the image forming apparatus.

FIG. 7A is an example (second example) of an image displayed on the touch panel display of each mobile terminal when three mobile terminals are connected to the image forming apparatus.

FIG. 7C is an example (second example) of an image displayed on the touch panel display of each mobile terminal when three mobile terminals are connected to the image forming apparatus.

DETAILED DESCRIPTION

In the following, embodiments according to the present disclosure will be described with reference to the drawings. The image forming apparatus according to the embodiments is used in combination with mobile terminals. Both are connected by short-range wireless communication (Bluetooth, Wi Fi Direct (both registered trademarks), and the like). Both the image forming apparatus and the mobile terminal are provided with a touch panel display, and the user can perform various operations on both by operating icons or the like displayed on the touch panel displays.

Figure 1:
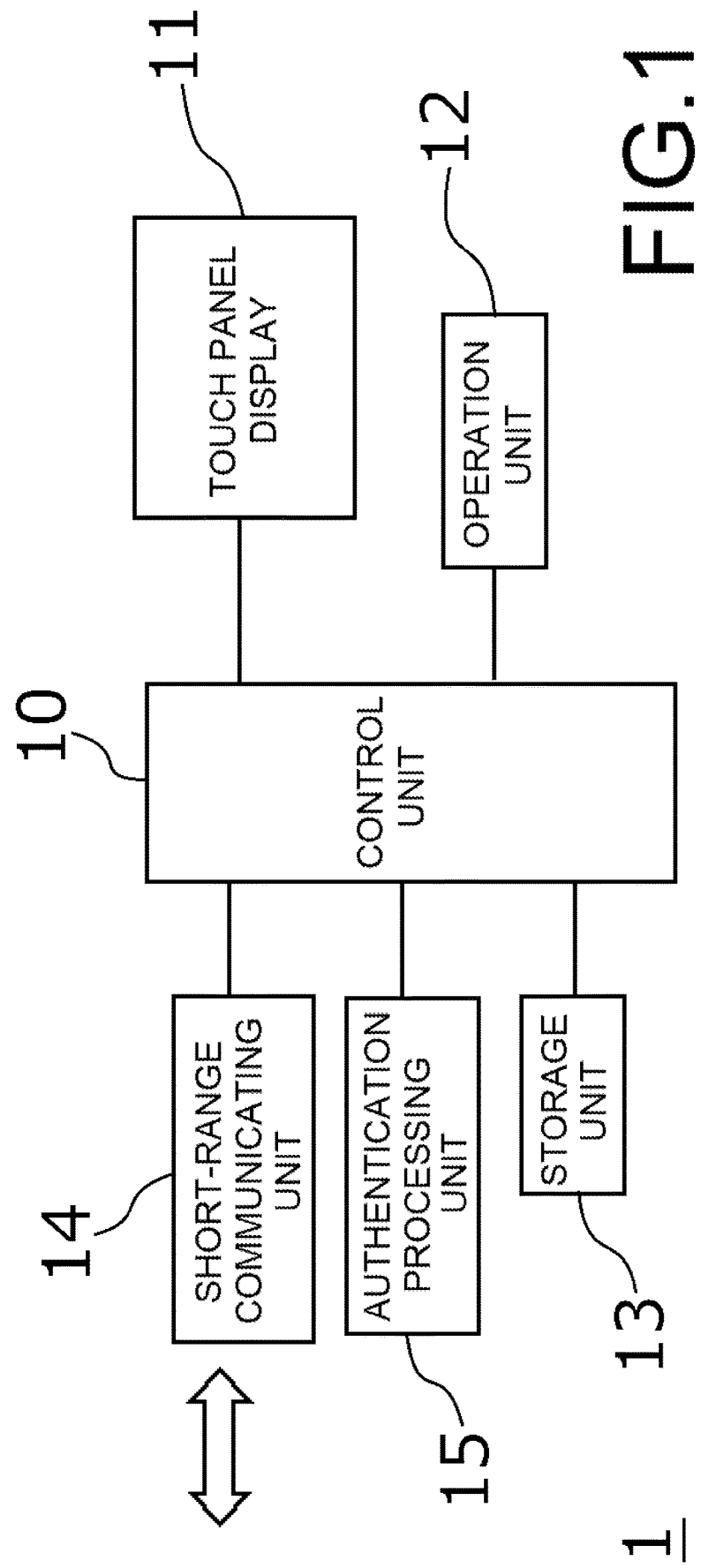
FIG. 1 is a block diagram illustrating a configuration of an image forming apparatus of an embodiment according to the present disclosure.

FIG. 1 is a diagram illustrating a configuration of an image forming apparatus 1. The image forming apparatus 1 is a multifunction printer having a printing function, a scanner function, a facsimile function, and the like, and has various constituent elements used in each of these functions. In addition, it is also possible to exchange various data such as image data and the like with a mobile terminal. However, since the constituent elements related to each of these functions are the same as those of the conventionally known multifunction printer, descriptions of these constituent elements are omitted in FIG. 1. On the other hand, a feature of this image forming apparatus 1 is overall control thereof, or control of mobile terminals connected thereto using the short-distance communication function, so only the constituent elements related to these controls are illustrated in FIG. 1.

A control unit (apparatus side control unit) 10 equipped with a CPU can cause various images including an image used for operation to be displayed on a touch panel display (apparatus side touch panel display) 11. In addition, the control unit 10 can recognize a position touched by the user on the surface of the touch panel display 11, and from this can recognize the operation contents by the user. Moreover, apart from the touch panel display 11, an operation unit 12 including a plurality of operation keys is also provided, and the control unit 10 also receives operations by the user via the operation unit 12. Operation via the touch panel display 11 and operation via the operation unit 12 are appropriately set according to the contents. For example, operation keys for selecting one of the copy function, the scanner function, and the facsimile function are provided on the operation unit 12, and on the touch panel display 11 side, a menu screen corresponding to the operation selected here is displayed. Moreover, a start key (start button) for starting the copy function and facsimile transmission function and a reset button of the apparatus are also provided on the operation unit 12. On the other hand, on the touch panel display 11, operation keys that are displayed according to the hierarchy of the screen layers change, and for example, operation keys for performing detailed settings of each unit of the image forming apparatus 1 are provided on the screen of the lower layer side of the touch panel display 11. In addition, a storage unit 13 is also provided for storing data necessary for performing the operation of the image forming apparatus 1 and data to be outputted.

In addition, a short-range communicating unit (communicating unit) 14 is provided as an interface for communicating with a mobile terminal. The short-range communicating unit 14 performs wireless communication according to wireless communication standards such as Bluetooth, WiFi Direct (both registered trademarks), and the like, and exchanges various data among these. In this case, an authentication processing unit 15 is also provided for obtaining the identification information of a mobile terminal with which communication is to be performed, and for authenticating that connection. Here, from this identification information, the control unit 10 can also recognize the type (model) of the connected mobile terminal. Information necessary for these operations is stored in the storage unit 13.

Figure 2:
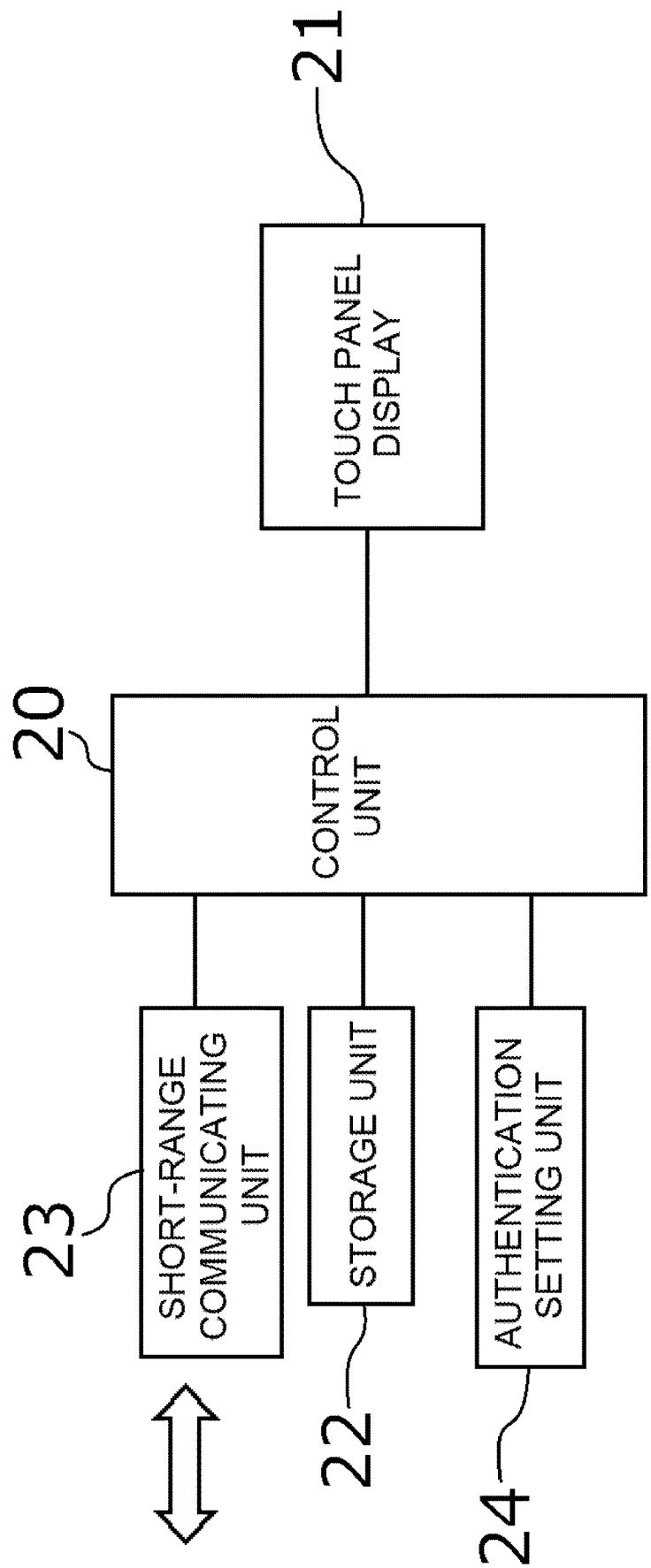
FIG. 2 is a block diagram illustrating a configuration of a mobile terminal used in an image forming system of an embodiment according to the present disclosure.

FIG. 2 is a diagram illustrating a configuration of a mobile terminal 2 connected to the image forming apparatus 1 by wireless communication. In the mobile terminal 2, a function for performing a call, an imaging function, and the like are provided, however, similar to the case of the image forming apparatus 1, only the constituent elements related to the present disclosure are described here. On the mobile terminal 2 side as well, similar to the image forming apparatus 1 side, a control unit (terminal side control unit) 20, a touch panel display (terminal side touch panel display) 21, a storage unit 22, and a short-range communicating unit (communicating unit) 23 are similarly provided. The control unit (terminal side control unit) 20 performs overall control. The touch panel display (terminal side touch panel display) 21 performs input and output. The storage unit 22 stores various kinds of data. The short-range communicating unit (communication unit) 23 communicates with the image forming apparatus 1 side and performs authentication thereof.

Actually, there are cases where instead of a only a single mobile terminal 2 being connected to the image forming apparatus 1 by wireless communication, a plurality of mobile terminals 2 are used. In this case, although there are various types (models) of the plurality of mobile terminals 2, each has the constituent elements illustrated in FIG. 2 and can perform the same operations. In this case, there is also provided an authentication setting unit 24 for setting whether or not to permit recognition of individual mobile terminals 2 from another mobile terminal 2. This setting is performed by the user via the touch panel display 21, and the control unit 20 performs operation according to this setting. In addition, the touch panel display 11 on the image forming apparatus 1 side and the touch panel display 21 on the mobile terminal 2 side have equivalent functions, and although the sizes of these displays are different, the same operations are possible.

The control unit 10 on the image forming apparatus 1 side and the control unit 20 on the mobile terminal 2 side can exchange various data with each other via the short-range communicating units 14, 23. As this data, there is image data that is displayed on the touch panel display 11 of the image forming apparatus 1, image data that is displayed on the touch panel display 21 on the mobile terminal 2 side, and operation data corresponding to the contents of the operation performed on these touch panel displays. This image data is an image in which icons as described above are displayed, and the operation data includes data indicating which one of these icons has been operated, or what kind of operation is performed on an icon. Moreover, for example, image data and the like stored in the storage unit 22 of the mobile terminal 2 can be transmitted to the image forming apparatus 1 side, and on the image forming apparatus 1 side, this image can be printed and outputted.

Figure 3:
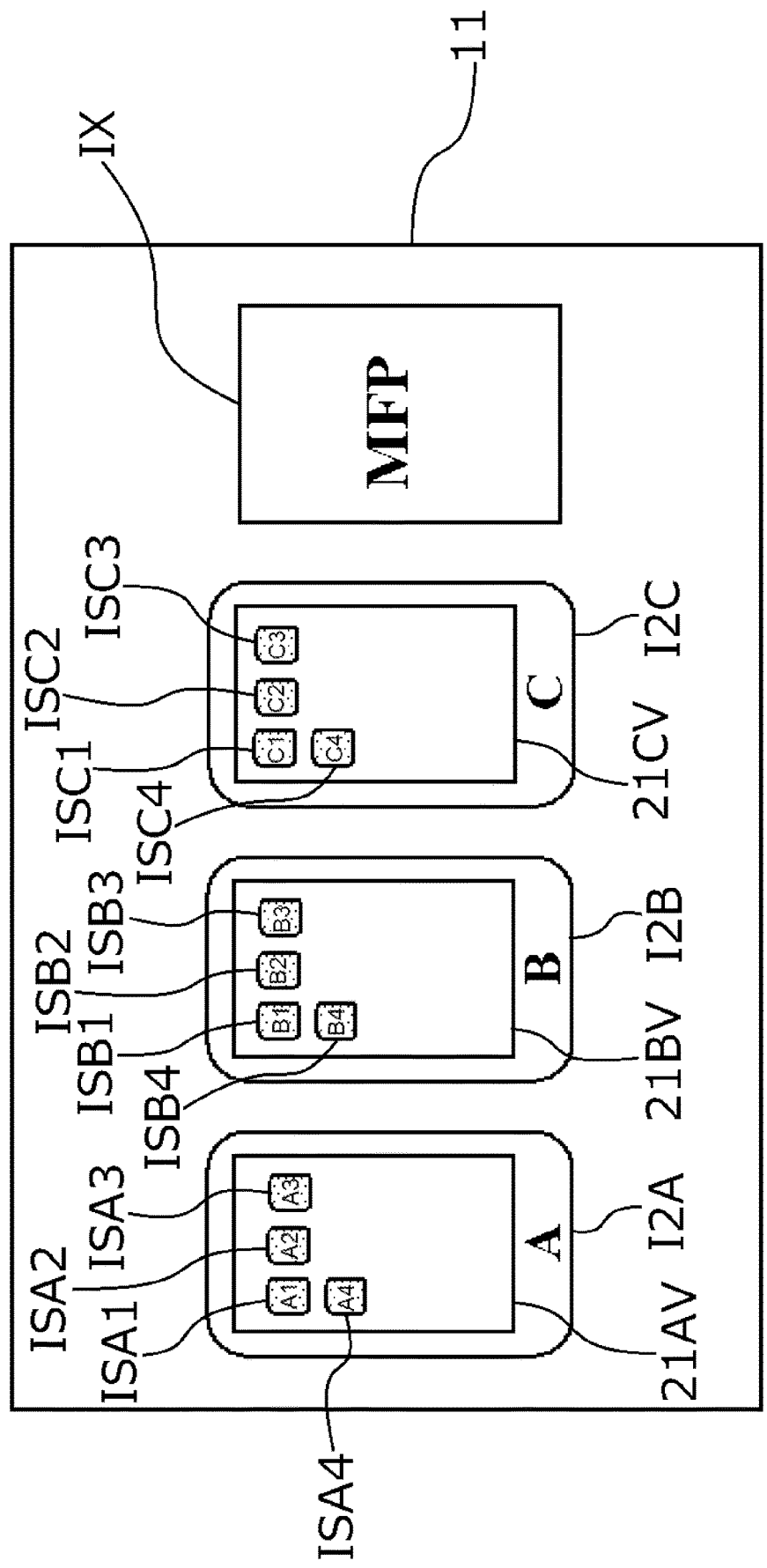
FIG. 3 illustrates an example of an image displayed on a touch panel display on the image forming apparatus side when three mobile terminals are connected.

FIG. 3 illustrates an example of an image displayed on the touch panel display 11 when the control unit 10 recognizes that three mobile terminals 2 (2A, 2B, and 2C) are connected to the image forming apparatus 1. Here, images imitating the outer appearance including each of the touch panel displays 21 corresponding to the mobile terminals 2A, 2B, 2C are displayed as icons I2A, I2B and I2C, and at the same time, an image of the image forming apparatus 1 itself is displayed as an icon IX. Although it is illustrated in a simplified manner in FIG. 3, the outer appearance of the icons I2A, I2B, and I2C may be displayed so as to correspond to the model, and the model name may be displayed small.

Figure 4:
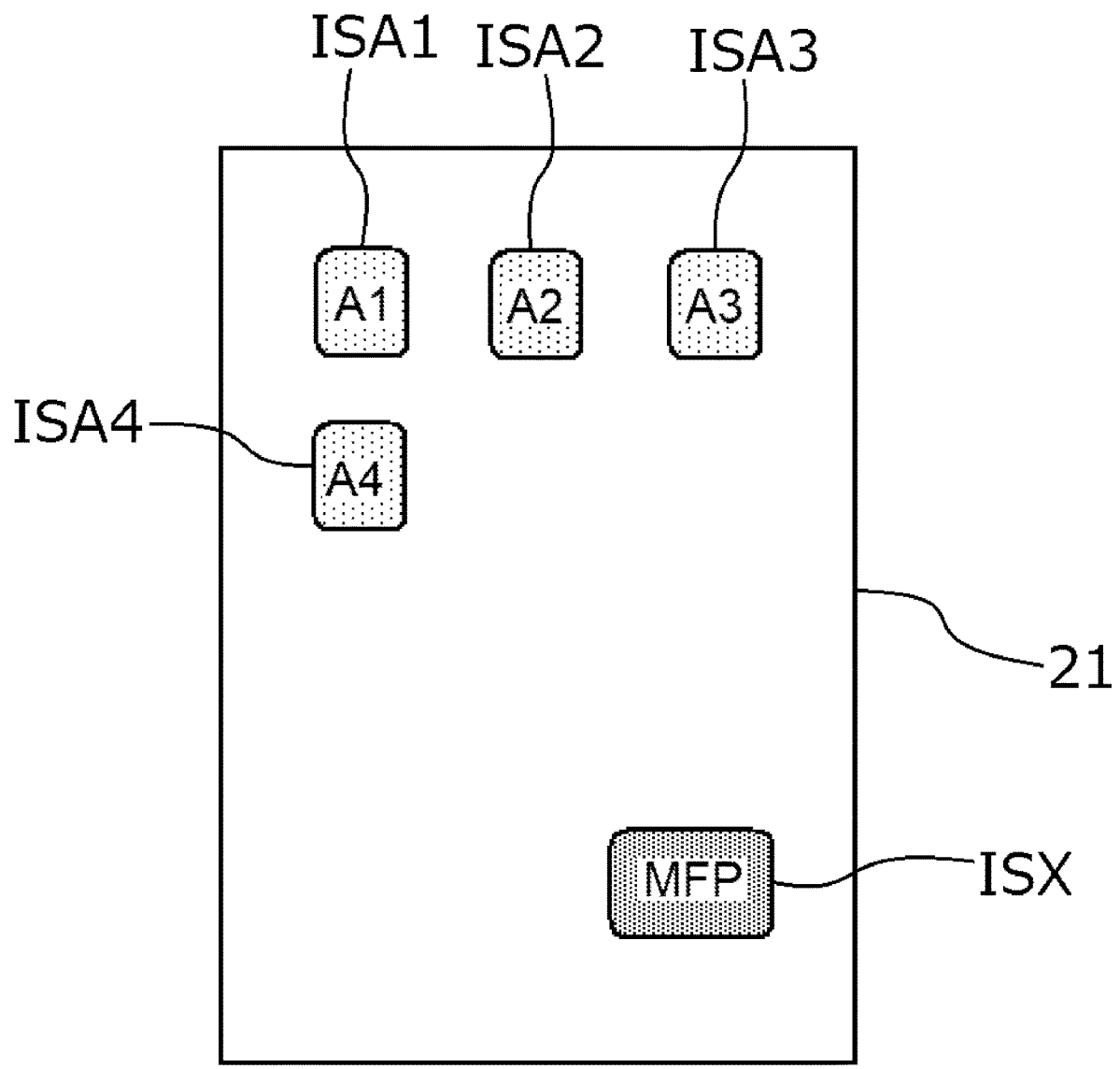
FIG. 4 illustrates an example of an image displayed on a touch panel display on the mobile terminal side when connected to the image forming apparatus.

FIG. 4 illustrates an example of an image displayed on the touch panel display 21 side of the mobile terminal 2A side at the same time that the display of FIG. 3 is performed on the touch panel display 11 side. Here, it is assumed that the mobile terminals 2B and 2C side cannot be recognized from the mobile terminal 2A side, and the case where another mobile terminal can be recognized from the mobile terminal 2A side will be described later. Here, the icons ISA1 to ISA4 corresponding to applications A1 to A4 used in the mobile terminal 2A are displayed, and the icon ISX corresponding to the connected image forming apparatus 1 is displayed. When the user operates any one of the icons ISA1 to ISA4, the application corresponding to this is activated, and after that, the execution screen of this application is displayed. The display of the icons ISA1 to ISA4 is the same as in the case where the mobile terminal 2A is not connected to the image forming apparatus 1. Then, by displaying the icon ISX, the user can recognize that this mobile terminal 2A is in a connected state to the image forming apparatus 1.

Therefore, the control when the control unit 20 on the mobile terminal 2A side performs an operations related to the icons ISA1 to ISA4 (applications A1 to A4) is not changed from the operation of a conventionally known mobile terminal (smartphone). On the other hand, the operation related to the icon ISX is similar to the above-described typical technique. In other words, in the case where the control unit 20 recognizes that the icon ISX has been operated, the control unit 20 transmits a notification to that effect to the control unit 10 on the image forming apparatus 1 side. The control unit 10 that receives this transmits the above-described image data (apparatus side image data) used for setting of the image forming apparatus 1 and displayed on the touch panel display 11 to the control unit 20 side, and the control unit 20 causes this image to be displayed on the touch panel display 21. After that, the control unit 20 transmits the operation content for this screen, for example operation data (terminal side operation data) to the control unit 10 side. The operation data indicates, for example, which icon in this image has been operated, or in what way which icon has been operated. The control unit 10 performs control (setting) in the image forming apparatus 1 according to this. Alternatively, the following operation is repeated until the setting of the image forming apparatus 1 side is completed: the control unit 10 transmits the next image data (apparatus side image data) according to this operation to the control unit 20 side, the control unit 20 receives the next operation, and the control unit 20 transmits the operation data (terminal side operation data) corresponding to this to the control unit 10 side.

In other words, by performing an exchange of apparatus side image data and terminal side operation data as described above, the setting of the image forming apparatus 1 can be performed from the mobile terminal 2A side by using the touch panel display 21 of the mobile terminal 2A. This is also the same for mobile terminals 2B and 2C.

In addition, in the image forming apparatus 1, when the icon IX is operated on the display illustrated in FIG. 3, the control unit 10 causes the display of the touch panel display 11 to shift to the initial screen of the image forming apparatus 1. This initial screen is equivalent to the screen when the mobile terminals 2A to 2C are not connected; for example, in the case where the function set in the default state of this image forming apparatus 1 is the copy function, the screen is the setting screen for the copy function. After that, operation is performed regardless of whether there is a connection with the mobile terminals 2A to 2C. In other words, in the subsequent operations, the user can use a copy function, a scanner function, or the like by operating only the image forming apparatus 1.

For the icons I2A, I2B, and I2C in FIG. 3, respective virtual display units 21AV, 21BV, and 21CV, which are virtual touch panel displays corresponding to the touch panel display 21, are displayed, respectively. The icons ISA1 to ISA4 in FIG. 4 are similarly displayed on the virtual display unit 21AV. In other words, on the touch panel display 11, a display similar to that on the mobile terminal 2A side in FIG. 4 is performed except that icons other than the icon ISX are not displayed. For icons I2B and I2C as well, icons ISB1 to ISB4 and ISC1 to ISC4 corresponding to the applications on the respective virtual display units 21BV and 21CV are displayed in the same manner.

When the control unit 10 causes the display illustrated in FIG. 3 to be displayed on the touch panel display 11, the control unit 10 obtains image data (terminal side image data) to be displayed on the touch panel display 21 of the mobile terminals 2A, 2B, 2C from the respective control units 20 of the mobile terminals 2A, 2B, 2C. After the display illustrated in FIG. 3 is performed, the control unit 10 recognizes the operation by the user on the virtual display unit 21AV in FIG. 3, and can recognize this operation as an operation on the icons ISA1 to ISA4 on the virtual display unit 21AV. The control unit 10 transmits the operation data (apparatus side operation data) to the control unit 20 on the mobile terminal 2A side, and after receiving this operation data, the control unit 20 can perform the same operation as in the case where the corresponding icon is operated on the display illustrated in FIG. 4. For example, in the case where the application A1 is set to be activated when the icon ISA1 is operated, the application A1 is activated.

Figure 5:
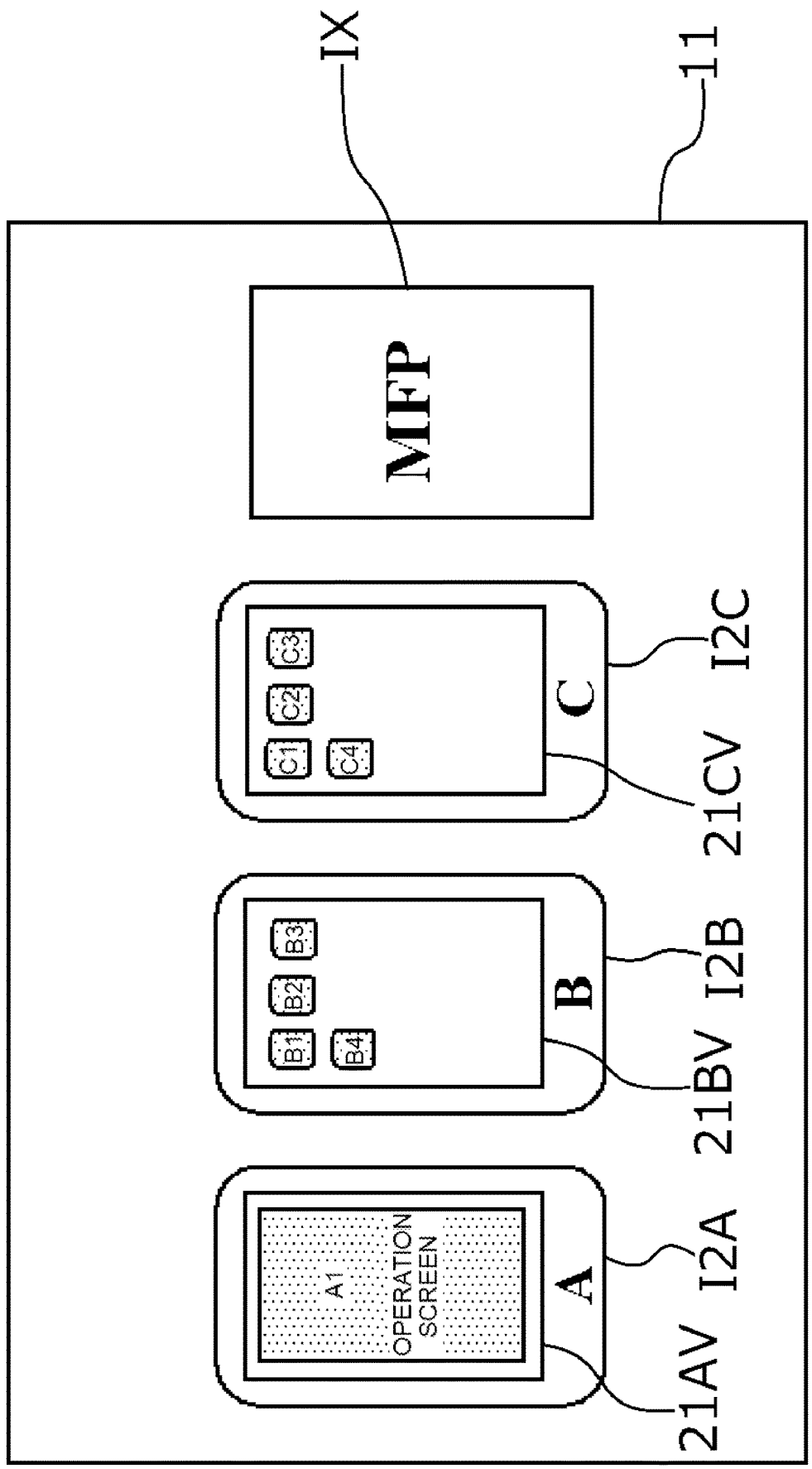
FIG. 5 is an example of an image displayed on the touch panel display on the image forming apparatus side when an application is executed on the mobile terminal.

At this time, when the application A1 is executed, the control unit 20 causes an image that is to be displayed on the touch panel display 21 to be displayed on the touch panel 21, and at the same time transmits this image to the control unit 10 side as new terminal side image data. As illustrated in FIG. 5, the control unit 10, after receiving this image data, displays the terminal side image data on the virtual display unit 21AV. Here, an execution screen of the application A1 is displayed on the virtual display unit 21AV. After that, when any operation is performed by the user on this screen, the control unit 10 transmits the contents as the apparatus side operation data to the control unit 20 side, and the control unit 20 performs the same control as in the case where the same operation is performed on the touch panel display 21 on the mobile terminal 2A side.

Therefore, the user can operate the application on the mobile terminal 2A by using the touch panel display 11 (the virtual display unit 21AV) on the image forming apparatus 1 side in the same way as in the case of using the touch panel display 21 on the mobile terminal 2A side. At this time, this operation is actually performed only on the mobile terminal 2A, and the touch panel display 11 on the image forming apparatus 1 side is used only for the operation. In the case where another application (icon) on the mobile terminal 2A in FIG. 2, or another mobile terminal 2B, 2C is operated as well, similarly, the same operation as in the case where the touch panel display 21 of each mobile terminal is operated is performed.

For example, when performing an operation of processing the image data saved in the mobile terminal and then outputting that image data by the image forming apparatus 1, the above-described operation is extremely effective. When an application for processing the image data in this way is installed on the mobile terminal side, the user can perform this processing operation by just an operation on the image forming apparatus 1 side, and after that, can output the processed image by the image forming apparatus 1. In this case, as long as the mobile terminal is at a distance that allows communication with the image forming apparatus 1, there is no need to perform any operation on the mobile terminal side. Therefore, this operation can be performed particularly efficiently. On the other hand, applications that are necessary for the operation only have to be installed on the mobile terminal side. Moreover, it is possible to control the entire image forming system that is configured by the image forming apparatus 1 and the mobile terminals 2A, 2B, 2C by just operating the image forming apparatus 1 (the touch panel display 11, the operation unit 12).

Figure 6B:
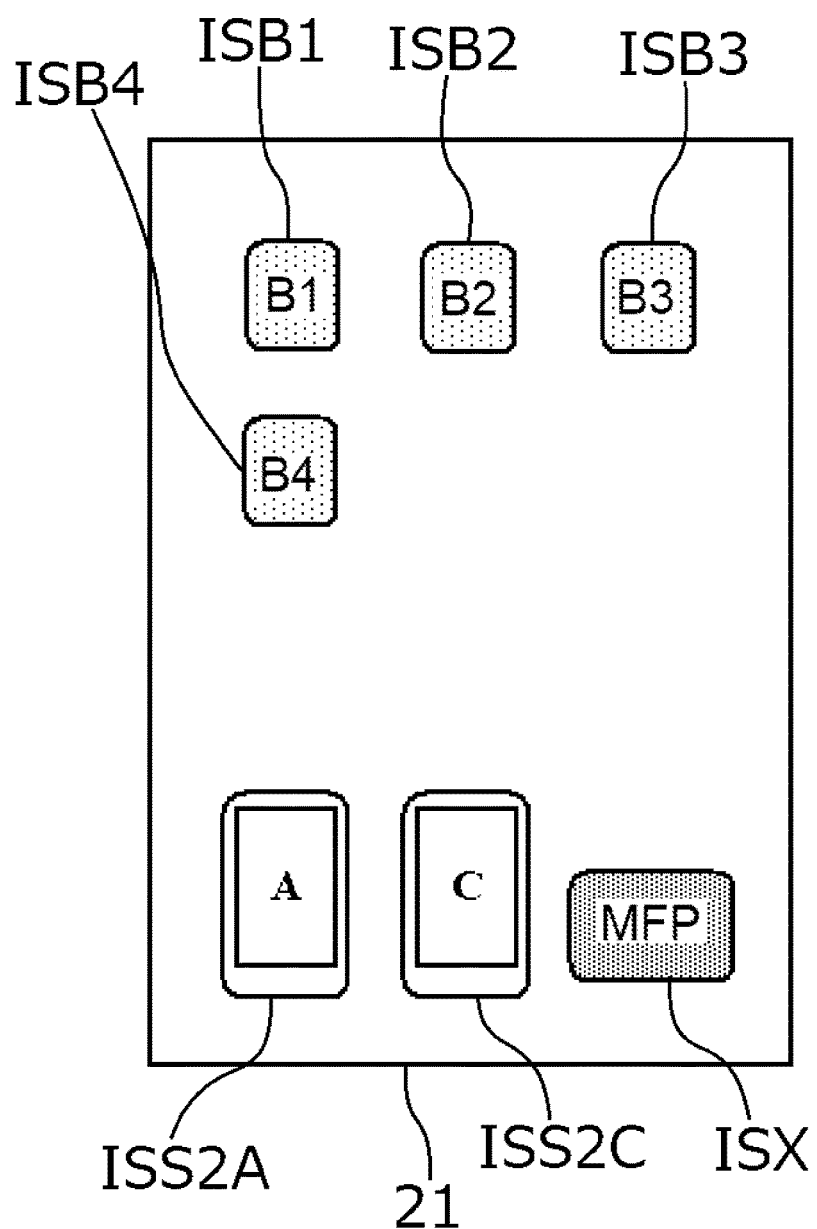
FIG. 6B is an example (first example) of an image displayed on the touch panel display of each mobile terminal when three mobile terminals are connected to the image forming apparatus.
Figure 6C:
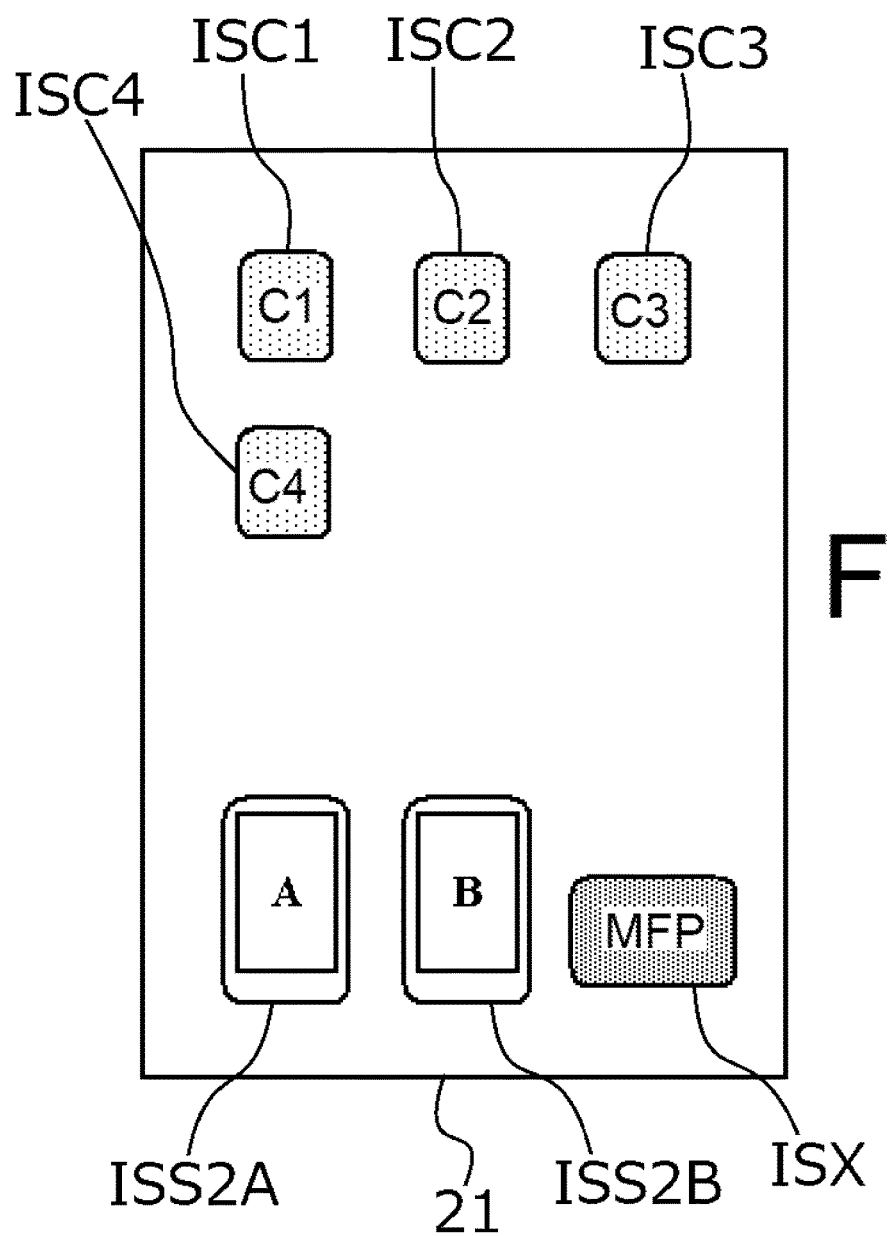
FIG. 6C is an example (first example) of an image displayed on the touch panel display of each mobile terminal when three mobile terminals are connected to the image forming apparatus.

In the example described above, as illustrated in FIG. 4, the icon ISX corresponding to the image forming apparatus 1 is displayed on the display on the mobile terminal 2A side, whereas no display is performed related to the other mobile terminals 2B and 2C. Therefore, the user of the mobile terminal 2A cannot recognize the presence or absence of a connection with the other mobile terminals 2B and 2C. This kind of permitting or not permitting the recognition of other mobile terminals can be set from each mobile terminal side by using the authentication setting unit 24 in FIG. 2. This setting can be performed by the control unit 20 of each mobile terminal by making an inquiry to the user via the touch panel display 21. For example, in the case where the mobile terminals 2A, 2B, and 2C are all set to permit recognition from another mobile terminal, the display on the touch panel display 21 on each of the mobile terminals 2A, 2B, 2C are as illustrated in the examples in FIGS. 6A to 6C. Here, the other two mobile terminals (icons ISS2B, ISS2C in FIG. 6A, icons ISS2A, ISS2C in FIG. 6 B, and ISS2A, ISS2B in FIG. 6 C) are displayed on each mobile terminal. Moreover, on the mobile terminal 2A (FIG. 6A), icons ISA1 to ISA4 corresponding to the applications A1 to A4 are respectively displayed. On the mobile terminal 2B (FIG. 6B), icons ISB1 to ISB4 corresponding to the applications B1 to B4 are respectively displayed. On the mobile terminal 2C (FIG. 6C), icons ISC1 to ISC4 corresponding to the applications C1 to C4 are respectively displayed.

Figure 7B:
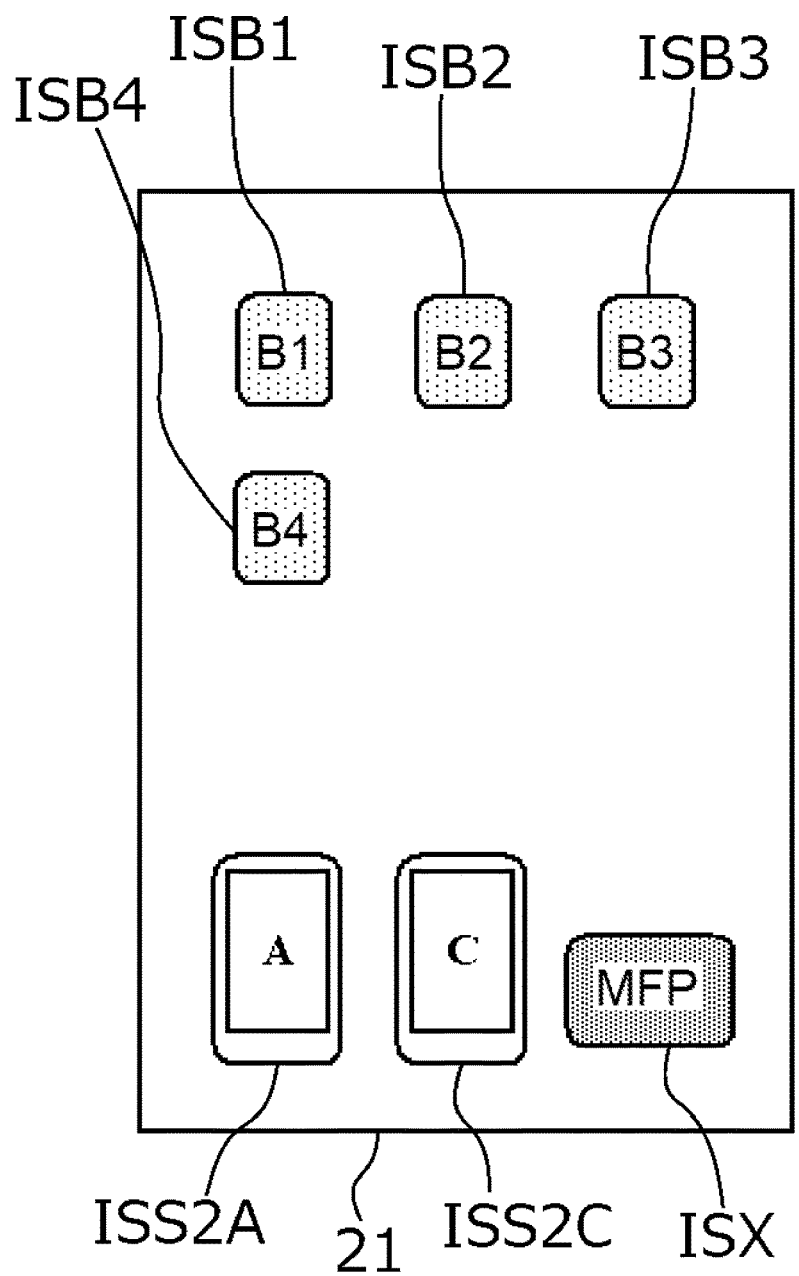
FIG. 7B is an example (second example) of an image displayed on the touch panel display of each mobile terminal when three mobile terminals are connected to the image forming apparatus.

On the other hand, FIGS. 7A to 7C illustrate similar displays in the case where only the mobile terminal 2B itself is not permitted to be recognized from another mobile terminal. In this case, in FIG. 7A and FIG. 7C, the icon ISS2B is not displayed.

A description will be given of a case where the setting is made such that a mobile terminal itself can be recognized from other mobile terminals in this manner. In this case, it is possible to perform an operation on the mobile terminal side such as performed by the control unit 10 of the image forming apparatus 1, such that only the input and output are performed on the touch panel display of the mobile terminal itself, and the execution of the application is performed by an another mobile terminal. In other words, by causing the same operation as performed by the control unit 10 to be performed by the control unit 20 of the mobile terminal 2 (2A, 2B, 2C), it is possible, for example, to virtually cause the mobile terminal 2B to perform the operation by the mobile terminal 2A. At this time, the content (terminal side operation data) of the operation performed on the touch panel display 21 of the mobile terminal 2A and the image (terminal side image data) virtually displayed by the mobile terminal 2A in accordance to this must be exchanged between the terminals 2A and 2B. However, this can be performed via the image forming apparatus 1. In other words, the control unit 10 also performs this operation.

Figure 8:
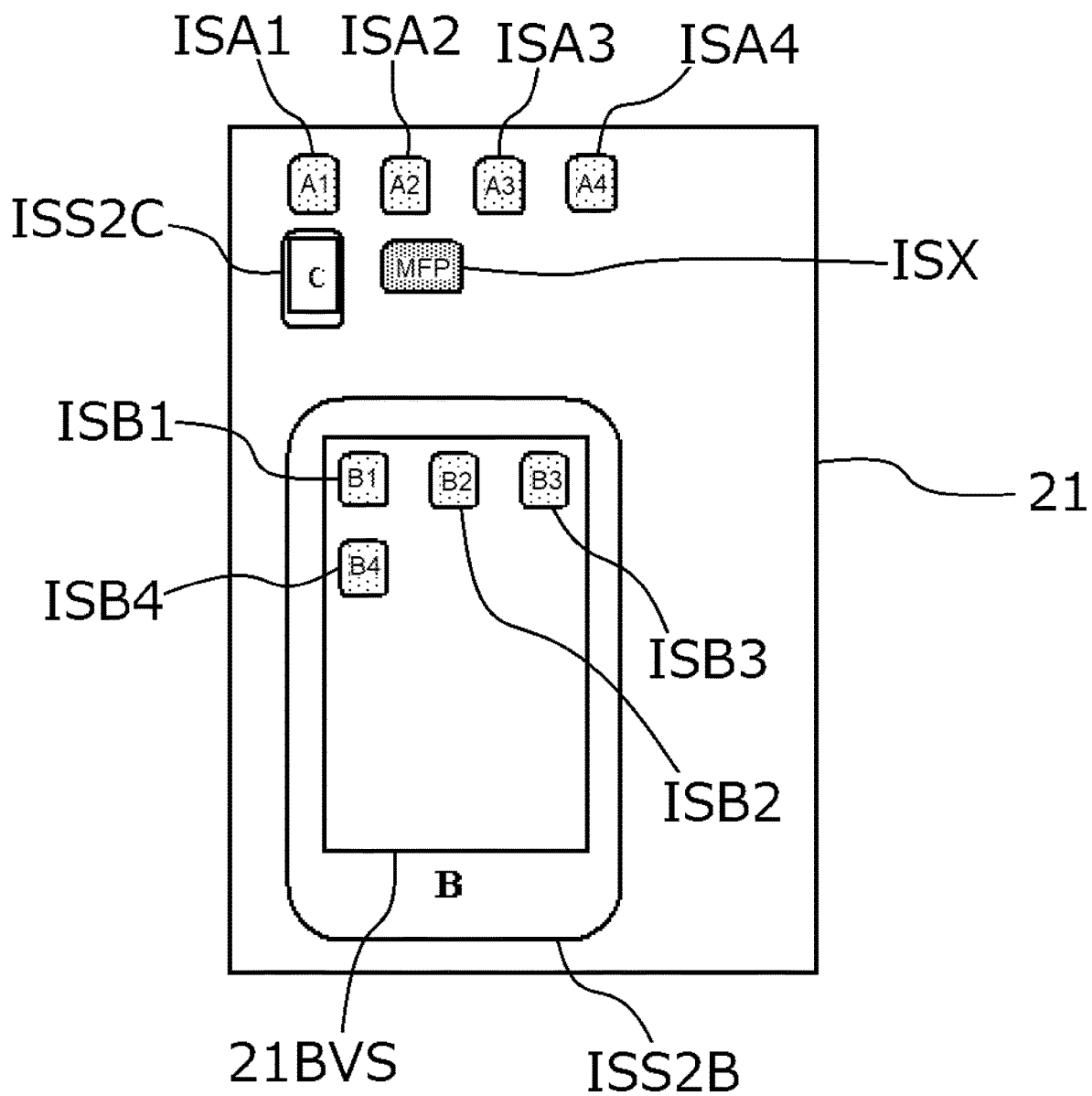
FIG. 8 illustrates an example of an image displayed on a touch panel display when operating an application on another mobile terminal in the mobile terminals connected to the image forming apparatus.

FIG. 8 illustrates a display immediately after the icon ISS2B is operated on the mobile terminal 2A on which the display in FIG. 6A has been performed in this case. Here, the icon ISS2B is enlarged and displayed, and the icons ISB1 to ISB4 (corresponding to the applications B1 to B4) provided therein can be displayed on the virtual display portion 21BVS in the icon ISS2B on the touch panel display 21. The image (terminal side image data) to be displayed on the virtual display unit 21BVS can be acquired from the control unit 20 of the mobile terminal 21B by the control unit 20 of the mobile terminal 2A via the control unit 10 of the image forming apparatus 1.

After that, the control unit 20 of the mobile terminal 2A can transmit the content of the operation (terminal side operation data) performed on the virtual display unit 21BVS to the control unit 20 of the mobile terminal 2 B via the control unit 10 of the image forming apparatus 1. Then, the control unit 20 of the mobile terminal 2B transmits the image to be displayed on the virtual display unit 21BVS afterward to the control unit 20 of the mobile terminal 2A via the control unit 10. This image is the same as the image to be displayed on the touch panel display 21 in the case where the same operation is performed on the mobile terminal 2B side. This is repeated until the operation of the application related to this operation is completed.

In other words, in the image forming system including this image forming apparatus 1 and the mobile terminals 2A, 2B, and 2C, an application can be executed by each apparatus by using a touch panel display provided on a apparatus other than one's own apparatus. The application is installed in each of the mobile terminals 2A, 2B, 2C. The respective apparatuses are the image forming apparatus 1, and the mobile terminals 2A, 2B, 2C.

Figure 9:
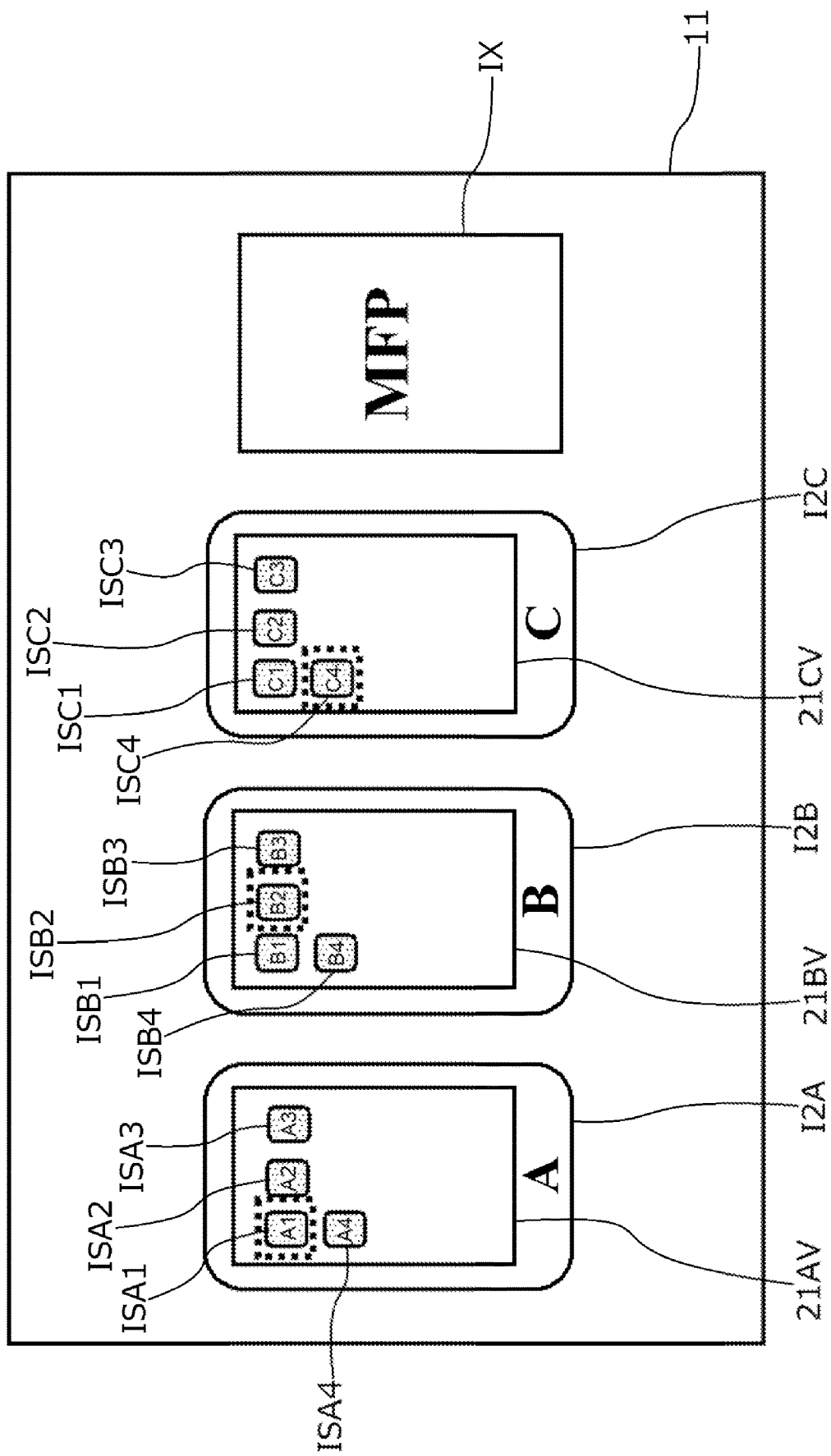
FIG. 9 illustrates an example (first example) of an image displayed on the touch panel display of the image forming apparatus in the case where there are overlapping applications between mobile terminals connected to the image forming apparatus.

In performing the above-described operation, the control units 10 and 20 can perform various operations in order to enhance convenience thereof. For example, in the state illustrated in FIG. 3, the application A1 in the mobile terminal 2A, the application B2 in the mobile terminal 2B, and the application C4 in the mobile terminal 2C may actually be the same application in some cases. In this case, the same result may be obtained regardless of which apparatus the operation of these applications is performed on. In this case, as illustrated in FIG. 9, the user can recognize this by emphasizing the display of the icons ISA1, ISB2, and ISC4 corresponding to these applications in the same color. The control unit 10 can cause this kind of display to be performed by performing such a determination. This display can also be performed similarly on the mobile terminal 2A, 2B, 2C side (FIG. 4).

Figure 10:
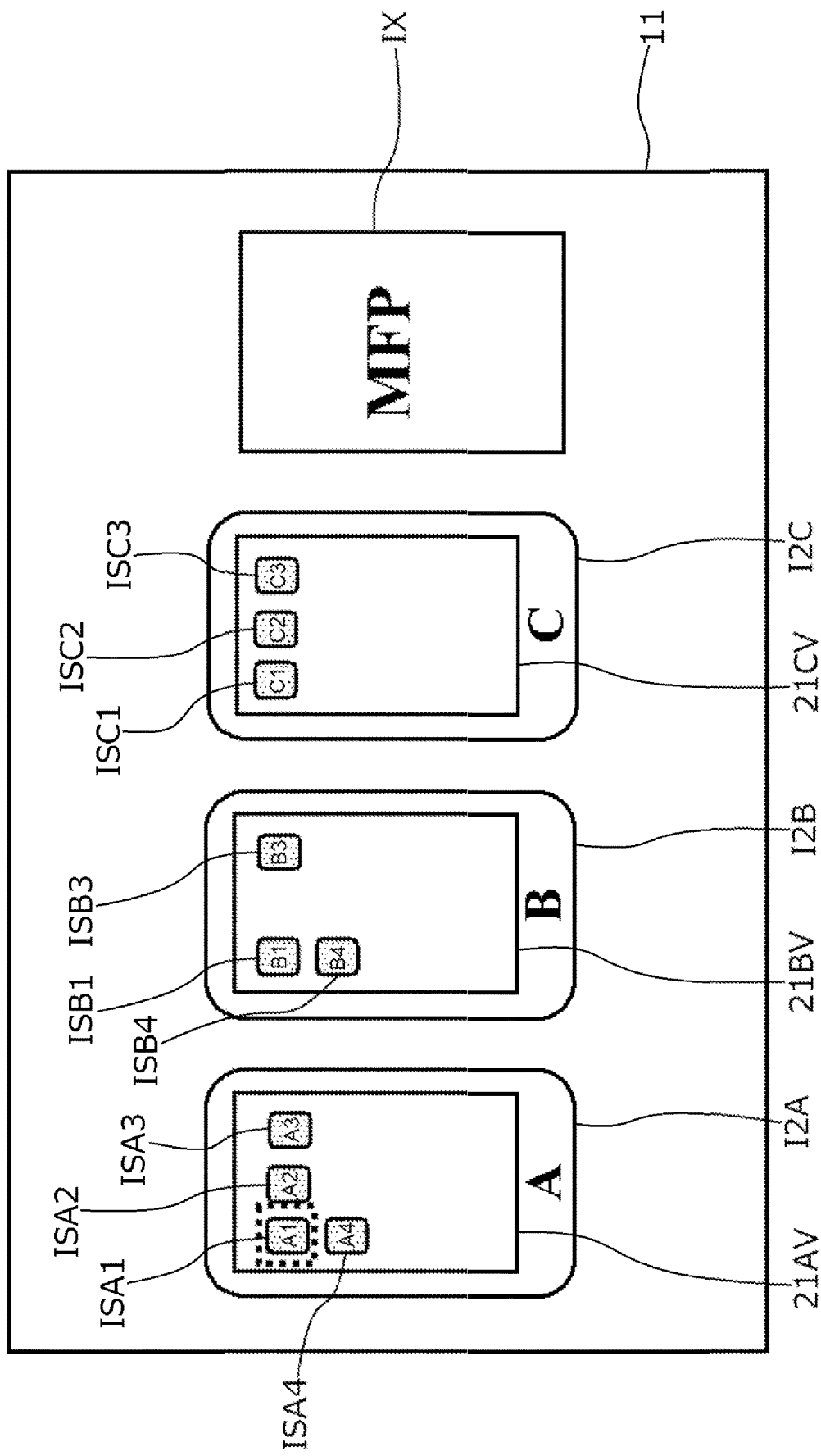
FIG. 10 illustrates an example (second example) of an image displayed on the touch panel display of the image forming apparatus in the case where there are overlapping applications between mobile terminals connected to the image forming apparatus.

In addition, in the case described above, it is not necessary to display icons corresponding to overlapping applications. Therefore, when performing the above-described display on the image forming apparatus 1 side, as illustrated in FIG. 10, the icon ISB2 on the virtual display unit 21BV and the icon ISC 4 on the virtual display unit 21CV may be deleted. Similarly, the icon ISB 2 may be deleted on the mobile terminal 2B and the icon ISC4 may be deleted on the mobile terminal 2C. In this case, in reality, the applications B2 and C4 are not uninstalled on the respective mobile terminals but are deleted on the display. In this case, by displaying the icon ISX in FIG. 8, the user can recognize that such a display is made for the sake of convenience.

Figure 11A:
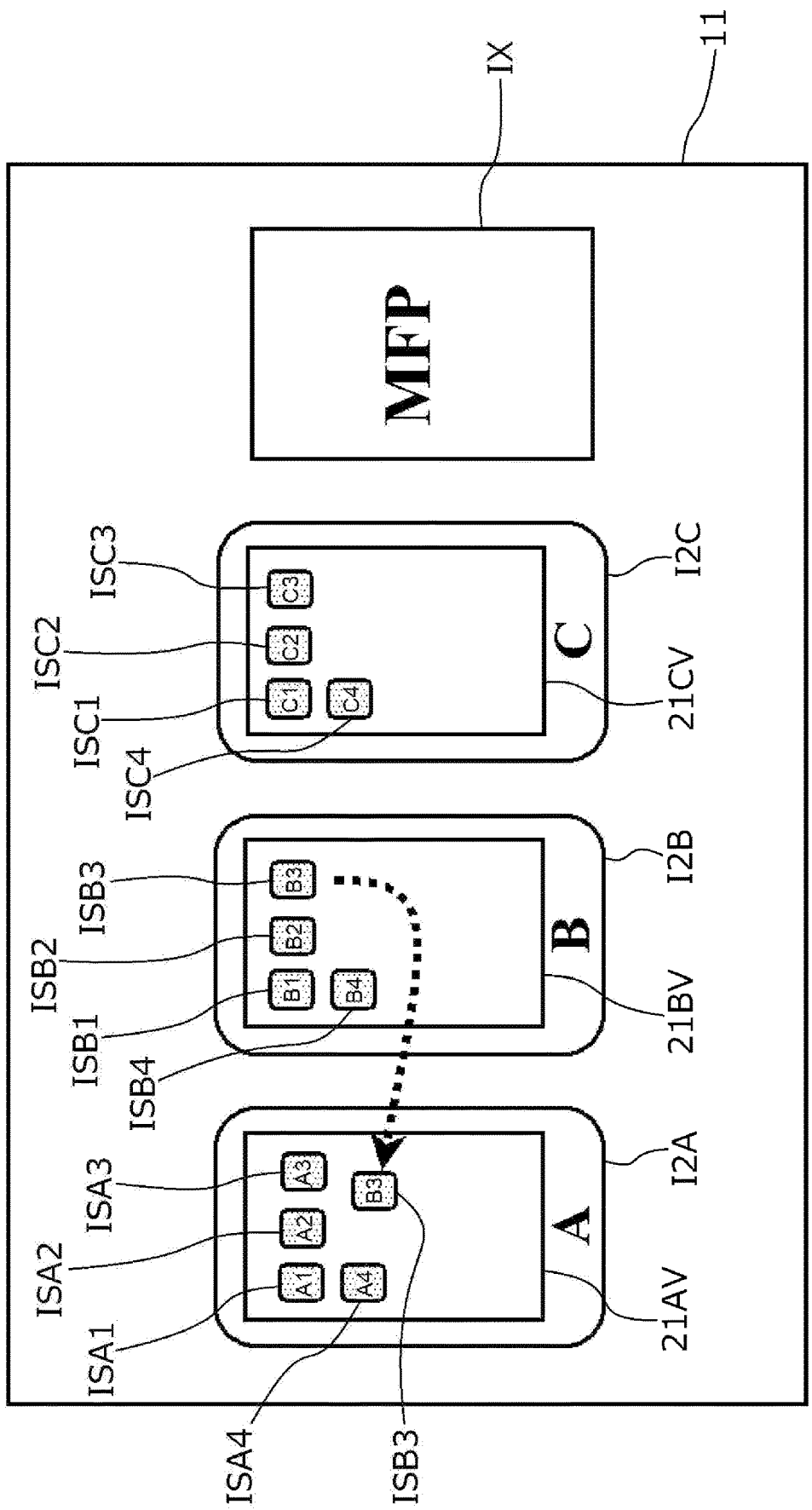
FIG. 11A is a diagram illustrating an example of an operation on an icon displayed on the touch panel display of the image forming apparatus.
Figure 11B:
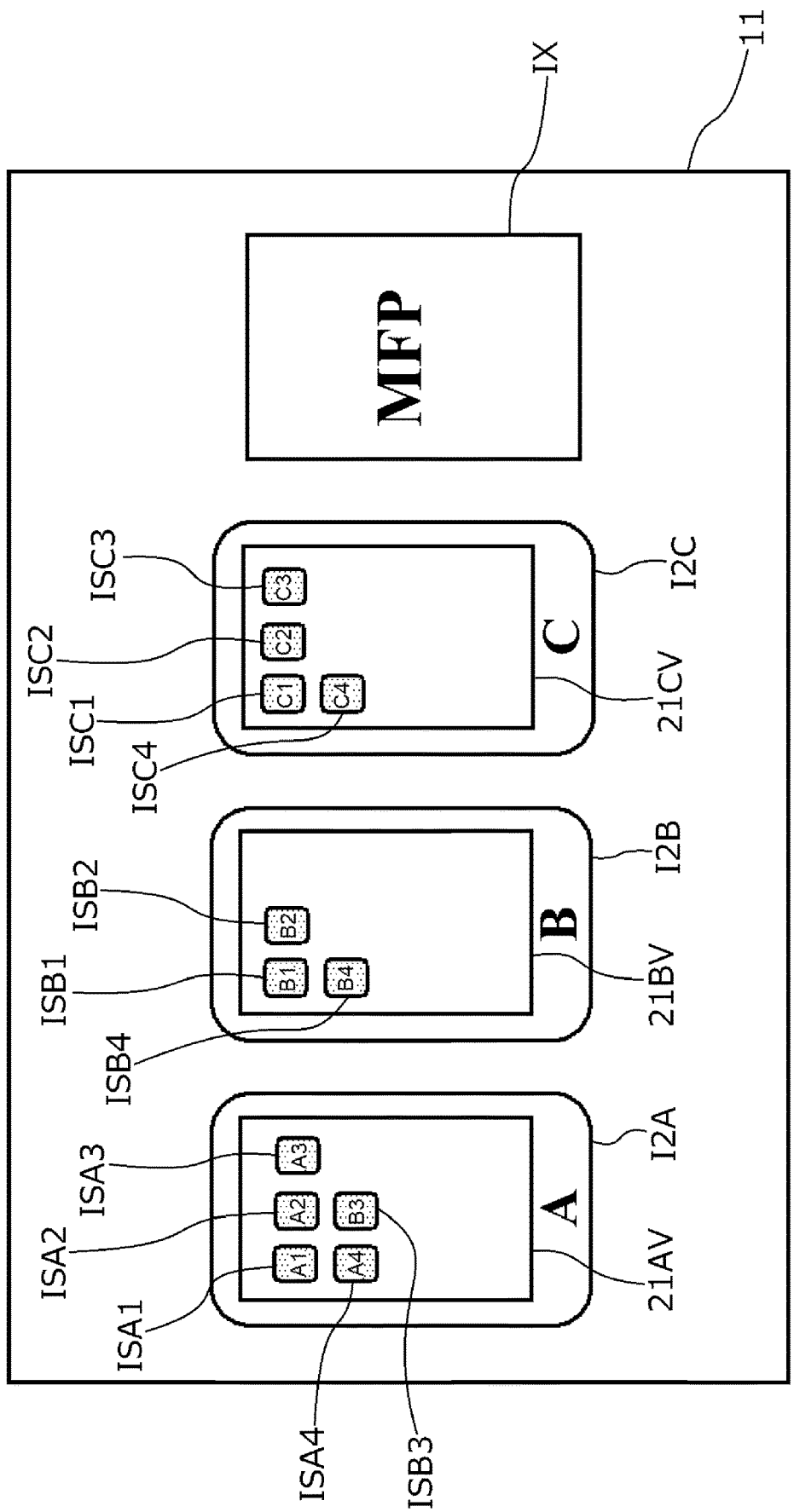
FIG. 11B is a diagram illustrating an example of an operation on an icon displayed on the touch panel display of the image forming apparatus.

In addition, in the case where the above-described operation becomes possible, there are cases where it is desired to operate the application B3 in the mobile terminal 2B from the mobile terminal 2A side due to the user's convenience. In such a case, by performing an operation on the image forming apparatus 1 side, it is possible to perform a setting so that this is easy. FIG. 11A illustrates an operation on the image forming apparatus 1 (touch panel display 11) side in this case, and FIG. 11B illustrates the displays on the mobile terminals 2A, 2B (touch panel displays 21) thereafter. In FIG. 11A, the user drags and moves the icon ISB3 on the virtual display unit 21BV corresponding to the mobile terminal 2B to the virtual display unit 21AV corresponding to the mobile terminal 2A. As a result, as illustrated in FIG. 11B, an icon ISB3 is added and displayed on the touch panel display 21 of the mobile terminal 2A. By performing an operation on the icon ISB3 after that, the application B3 can be executed on the mobile terminal 2B in the same manner as described above. At this time, on the touch panel display 21 of the mobile terminal 2A, as in the case described above, it is preferable to emphasize the display of the icon ISB3 in order to make the user recognize that the icon ISB3 is a special icon. On the touch panel display 21 of the mobile terminal 2B, the icon ISB3 may be left as is or may be displayed in a light color.

In the above-described operation, the control unit 10 recognizes the operation content in FIG. 11A and changes the display on the virtual display units 21BV, 21AV as illustrated in FIG. 11B. After that, in the case where the icon ISB 3 is operated on the virtual display unit 21AV, the control unit 10 can execute the application B3 by transmitting this operation content (apparatus side operation data) to the mobile terminal 21B.

Moreover, the same display as in FIG. 11B can be performed on the mobile terminal 2A, 2B side, and similarly, the application B3 can be executed by operating the mobile terminal 2A. In this case, the control unit 10 obtains the terminal side image data in which the icon ISB3 from the mobile terminal 2B (first mobile terminal) is included, and transmits the terminal side image data to the mobile terminal 2A (second mobile terminal). As a result, it is possible to cause the display including the icon ISB3 to be displayed on the touch panel display 21 of the mobile terminal 2A as illustrated in FIG. 11B. After that, when the icon ISB3 is operated, the mobile terminal 2A transmits the terminal side operation data of the contents to the control unit 10, then the control unit 10 transmits this to the mobile terminal 2B (first mobile terminal), and the mobile terminal 2B (control unit 20) causes the application B3 to be executed.

In this manner, terminal side image data and terminal side operation data are exchanged between one mobile terminal and another mobile terminal via the control unit 10 of the image forming apparatus 1. As a result, it is possible to cause an application installed on another mobile terminal to be executed by performing the operation virtually as if it were one of its own.

In any of the operations described above, the image forming apparatus or a mobile terminal can execute an application not installed in itself by just its own operation. When doing this, the respectively provided control unit can cause the above-mentioned operation to be performed by simply exchanging image data and operation data as described above, and particularly this kind of exchange of data can be efficiently performed by using the control unit of the image forming apparatus. On the other hand, the operation in the mobile terminal itself can be performed regardless of whether or not there is a connection with the image forming apparatus.

In the example described above, for example, configuration of the image forming apparatus other than that described in FIG. 1, and configuration of a mobile terminal other than that described in FIG. 2 are arbitrary. In other words, the configurations described above can be applied to image forming apparatuses and mobile terminals having various functions. Alternatively, this image forming apparatus and a mobile terminal can be combined to form a highly functional image forming system.

With the typical technique described above, it is possible to operate the image forming apparatus from the mobile terminal side. However, for example, the operation for performing various settings of the image forming apparatus must actually be performed while the user is located beside the image forming apparatus and confirming the situation. In addition, there are cases where it is not easy to perform the settings of the image forming apparatus by just operating a small mobile terminal. For this reason, it is actually difficult to perform all the operations on the side of this image forming apparatus on the mobile terminal side, or in some cases performing the operation on the mobile terminal side is not appropriate.

Moreover, there are various models of image forming apparatuses and mobile terminals, however forming operation screens and the like on the image forming apparatus side that correspond to all of the operations such as described above and that are capable of mutually corresponding to each of the models is difficult.

Therefore, even in the case where it is possible to operate the image forming apparatus from the mobile terminal side as in the above-described typical technique, in reality, in many cases, performing operation on the image forming apparatus side together with the mobile terminal is required. Therefore, in the case where a mobile terminal and an image forming apparatus are used in combination, a technique capable of performing an operation by operating only one side is desired.

According to the above configuration, in the case where a mobile terminal and an image forming apparatus are used in combination, it is possible to perform an operation by operating only one side.

What is claimed is:
1. An image forming system comprising an image forming apparatus connected to a plurality of mobile terminals, wherein
  each of the plurality of mobile terminals is provided with a terminal side touch panel display;
  the image forming apparatus comprises
  a communicating unit that communicates with the mobile terminals and exchanges data;
  an apparatus side touch panel display that is used for self operation of the image forming apparatus; and
  a control unit that, via the communicating unit, a) receives terminal side image data from each of the plurality of mobile terminals, wherein the image data received from each of the plurality of mobile terminals is content that is displayed on the terminal side touch panel display of the respective mobile terminal, b) upon operation by a user on the apparatus side touch panel display, of the content displayed on the terminal side touch panel display of one of the plurality of mobile terminals, transmits apparatus side operation data corresponding to the operation by the user to the one mobile terminal, and c) causes an application in the one mobile terminal to be executed using the apparatus side operation data;

the control unit causes the apparatus side touch panel display to display a plurality of mobile terminal icons, each comprising a virtual display unit and corresponding to a respective mobile terminal of the plurality of mobile terminals;

causes the apparatus side touch panel display to display application icons in each of the virtual display units, wherein the application icons provided in each of the virtual display units correspond to applications present in the respective mobile terminals to which the virtual display units correspond; and when displaying the application icons in each of the virtual display units, recognizes a first application is duplicated among the plurality of mobile terminals, and on the apparatus side touch panel display, a) causes the apparatus side touch panel display to display a first application icon corresponding to the first application in the virtual display unit of only one of the plurality of mobile terminals which comprise the first application, and b) causes the first application icon to be displayed in a manner so as to be distinguishable from application icons corresponding to applications that are duplicated among the plurality of mobile terminals;

the terminal side touch panel display of each of the plurality of mobile terminals displays a plurality of mobile terminal display icons corresponding to mobile terminals of the plurality of mobile terminals other than itself when the mobile terminals other than itself are connected;

the control unit obtains the terminal side image data from a first mobile terminal of the plurality of mobile terminals, transmits the terminal side image data obtained from a first mobile terminal to a second mobile terminal of the plurality of mobile terminals, and then obtains terminal side operation data from the second mobile terminal and then transmits the terminal side operation data obtained from the second mobile terminal to the first mobile terminal;

the first mobile terminal operates based on the terminal side operation data obtained from the second mobile terminal; and the terminal side touch panel display of the second mobile terminal displays an icon corresponding to an application on the first mobile terminal.

2. The image forming system according to claim 1 wherein on the terminal side touch panel display of each of the plurality mobile terminals, whether or not the image forming apparatus is connected, is displayed as an icon.

3. The image forming system according to claim 1, wherein the control unit recognizes whether or not there is permission for recognizing itself from the other mobile terminals on each of the plurality of mobile terminals, and does not display an icon corresponding to the mobile terminal without the permission on the terminal side touch panel displays of the mobile terminals other than that mobile terminal.

4. The image forming system according to claim 1, wherein the control unit prompts selection of the icon corresponding to the application on the first mobile terminal that is displayed on the terminal side touch panel display of the second mobile terminal by operation on the apparatus side touch panel display.

* * * * *